United States Patent
Nelson et al.

(10) Patent No.: US 7,750,982 B2
(45) Date of Patent: Jul. 6, 2010

(54) AUTOSTEREOSCOPIC DISPLAY WITH FRESNEL LENS ELEMENT AND DOUBLE SIDED PRISM FILM ADJACENT A BACKLIGHT HAVING A LIGHT TRANSMISSION SURFACE WITH LEFT AND RIGHT EYE LIGHT SOURCES AT OPPOSING ENDS MODULATED AT A RATE OF AT LEAST 90 HZ

(75) Inventors: John C. Nelson, The Sea Ranch, CA (US); Robert L. Brott, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 286 days.

(21) Appl. No.: 12/051,509

(22) Filed: Mar. 19, 2008

(65) Prior Publication Data

US 2009/0237576 A1  Sep. 24, 2009

(51) Int. Cl.
 *G02F 1/1335* (2006.01)
(52) U.S. Cl. .............................. 349/15; 348/51; 348/55; 348/59
(58) Field of Classification Search .................... 349/15; 348/46–60
 See application file for complete search history.

(56) References Cited

U.S. PATENT DOCUMENTS

| 3,959,580 | A | 5/1976 | Chocol |
| 4,871,233 | A | 10/1989 | Sheiman |
| 7,150,531 | B2 | 12/2006 | Toeppen |
| 7,530,721 | B2 | 5/2009 | Mi et al. |
| 2001/0005284 | A1 | 6/2001 | Lee |
| 2002/0126389 | A1 | 9/2002 | Moseley et al. |
| 2005/0030621 | A1 | 2/2005 | Takahashi |

(Continued)

FOREIGN PATENT DOCUMENTS

EP     404289     12/1990

(Continued)

OTHER PUBLICATIONS

Ishikawa et al. "New Design for a Highly Collimating Turning Film," Eastman Kodak Company, SID 06 Digest, p. 514-517, 2006.

*Primary Examiner*—John Heyman

(57) ABSTRACT

An autostereoscopic display is described. The autostereoscopic display apparatus includes a backlight having opposing first and second light input surfaces and a light transmission surface extending between the opposing first and second light input surfaces and a right eye light source located to provide light into the first light input side and a left eye light source located to provide light into the second light input side, wherein the left eye light source and the right eye light source are configured to be modulated between the left eye light source and the right eye light source at a rate of at least 90 hertz. A double sided prism film is adjacent to the light transmission surface. The double sided prism film has a plurality of linear prism features on a first major surface and a plurality of lenticular features on a second major surface. The first major surface opposes the second major surface. The double sided prism film is disposed between the light transmission surface and a Fresnel lens element. A liquid crystal display panel is positioned to receive light transmitted through the double sided prism film.

20 Claims, 3 Drawing Sheets

U.S. PATENT DOCUMENTS

| | | |
|---|---|---|
| 2005/0052750 A1 | 3/2005 | King |
| 2005/0168815 A1 | 8/2005 | Maruyama |
| 2005/0168816 A1 | 8/2005 | Fukaishi |
| 2005/0276071 A1* | 12/2005 | Sasagawa et al. ........... 362/607 |
| 2006/0132673 A1 | 6/2006 | Ito |
| 2006/0170869 A1 | 8/2006 | Shestak |
| 2007/0188667 A1 | 8/2007 | Schwerdtner |

FOREIGN PATENT DOCUMENTS

| | | |
|---|---|---|
| EP | 764869 | 3/1997 |
| JP | 2000069504 | 3/2000 |
| JP | 2001-066547 | 3/2001 |
| JP | 2005292722 | 10/2005 |

* cited by examiner

AUTOSTEREOSCOPIC DISPLAY WITH FRESNEL LENS ELEMENT AND DOUBLE SIDED PRISM FILM ADJACENT A BACKLIGHT HAVING A LIGHT TRANSMISSION SURFACE WITH LEFT AND RIGHT EYE LIGHT SOURCES AT OPPOSING ENDS MODULATED AT A RATE OF AT LEAST 90 HZ

FIELD

The present disclosure relates to autostereoscopic displays that include a Fresnel lens element.

BACKGROUND

A stereoscopic display usually presents an observer with images with parallax from individual right and left eye viewpoints. There are two methods of providing the two eyes of the observer with the parallax images. In one method, the observer utilizes a pair of shutter or 3D glasses which transmit or block light from the viewer's eyes in synchronization with alternating the left/right image display. Similarly, in another method, right eye and left eye viewpoints are alternatively displayed and led to the respective eyes of the observer but without the use of 3D glasses. This second method is referred to as autostereoscopic and is desired for stereo 3D viewing because separate glasses are not needed.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Ensuring that the right and left light sources are on or off in synchronization with the image display is important to achieve a high quality autostereoscopic image. As these displays increase in size, the edge portions of the display exhibit a reduced quality autostereoscopic image. These large format displays do not provide a uniform quality autostereoscopic image across the width of the display since the angle between the edge of the display and the center of the display at the viewer position is too great. Therefore, improvements in the uniformity of the quality autostereoscopic image across the width of the display are desired.

BRIEF SUMMARY

The present disclosure relates to autostereoscopic displays that include a Fresnel lens element. The Fresnel lens element is disposed between a double-sided prism film and the viewer to converge light toward the viewer.

In a first embodiment, the autostereoscopic display apparatus includes a backlight having opposing first and second light input surfaces and a light transmission surface extending between the opposing first and second light input surfaces and a right eye light source located to provide light into the first light input side and a left eye light source located to provide light into the second light input side, wherein the left eye light source and the right eye light source are configured to be modulated between the left eye light source and the right eye light source at a rate of at least 90 hertz. A double sided prism film is adjacent to the light transmission surface. The double sided prism film has a plurality of linear prism features on a first major surface and a plurality of lenticular features on a second major surface. The first major surface opposes the second major surface. The double sided prism film is disposed between the light transmission surface and a Fresnel lens. A liquid crystal display panel is positioned to receive light transmitted through the double sided prism film.

In another embodiment, an autostereoscopic display apparatus includes a backlight, a double sided prism film, a Fresnel lens, a liquid crystal display panel, and a synchronization driving element. The backlight includes opposing first and second light input surfaces and a light transmission surface extending between the opposing first and second light input surfaces and a right eye light source located to provide light into the first light input side and a left eye light source located to provide light into the second light input side. The left eye light source and the right eye light source are configured to be modulated between the left eye light source and the right eye light source at a rate of at least 90 hertz. The double sided prism film is adjacent to the light transmission surface, the double sided prism film has a plurality of linear prism features on a first major surface and a plurality of lenticular features on a second major surface, the first major surface opposing the second major surface. The double sided prism film is disposed between the light transmission surface and the Fresnel lens. A liquid crystal display panel is positioned to receive light transmitted through the double sided prism film. A synchronization driving element synchronizes activation and deactivation of the right eye image solid state light source and the left eye image solid state light source with image frames displayed on the liquid crystal display panel.

In a further embodiment, an autostereoscopic display apparatus includes a backlight, a double sided prism film, a Fresnel lens, a liquid crystal display panel, and a synchronization driving element. The backlight includes opposing first and second light input surfaces and a light transmission surface extending between the opposing first and second light input surfaces and a right eye light source located to provide light into the first light input side and a left eye light source located to provide light into the second light input side. The left eye light source and the right eye light source are configured to be modulated between the left eye light source and the right eye light source at a rate of at least 90 hertz. The double sided prism film is adjacent to the light transmission surface, the double sided prism film has a plurality of linear prism features on a first major surface and a plurality of lenticular features on a second major surface, the first major surface opposing the second major surface. A liquid crystal display panel is positioned to receive light transmitted through the double sided prism film. A linear converging Fresnel lens element is disposed between the double sided prism film and the liquid crystal display panel. The Fresnel lens element has a facet side facing the double sided prism film. The facet side includes a plurality of linear facets extending parallel to the lenticular features. The linear converging Fresnel lens converges light transmitted through the double sided prism film toward a viewer of the autostereoscopic display apparatus. A synchronization driving element synchronizes activation and deactivation of the right eye image solid state light source and the left eye image solid state light source with image frames displayed on the liquid crystal display panel.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
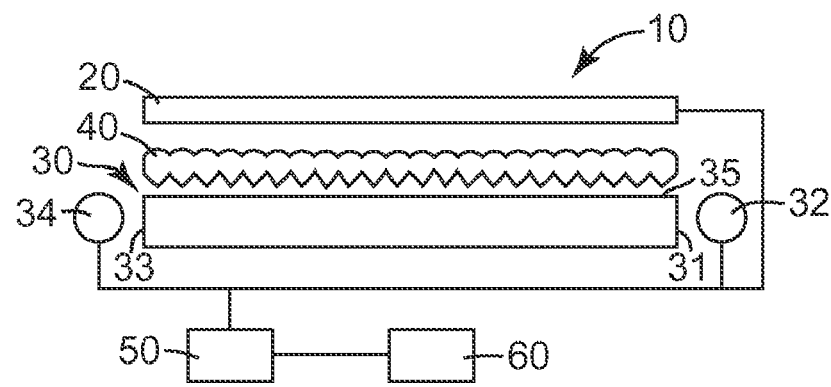
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception in the viewer even though the image is produced by a flat device. The term stereoscopic 3D incorporates the field of autostereoscopic devices but also includes the stereoscopic 3D display case in which special headgear, e.g. shutter glasses or polarized glasses, are need to see stereoscopic 3D from a flat display.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

The present disclosure relates to autostereoscopic displays that include a Fresnel element. The Fresnel element is disposed between a double-sided prism film and the viewer to converge light toward the viewer. A converging linear Fresnel lens is placed between an LCD panel and a directional backlight (e.g., lightguide and two-sided prism/lenticular film) illumination system to converge the light distribution from the entire display surface at the viewer position. Directional illumination systems without a Fresnel lens work well for small displays where the angle between the edge and center of the display at the viewer position is small. However, in larger displays only the display center produces a good time sequential autostereoscopic image because the left and right eye images from the display edges are not converged to the viewer. By adding the Fresnel lens element, much larger convergence angles are possible and enable larger 3D displays. While the present invention is not so limited, an appreciation of various aspects of the invention will be gained through a discussion of the examples provided below.

FIG. 1 is a schematic side view of an illustrative stereoscopic display apparatus 10. The display apparatus includes a liquid crystal display panel 20 having a frame response time of less than 10 milliseconds, or less than 5 milliseconds, or less than 3 milliseconds, and a backlight 30 positioned to provide light to the liquid crystal display panel 20.

The backlight 30 includes a light transmission surface 35 and opposing light input surfaces 31, 33. A right eye image solid state light source 32 injects light into a first light input surface 31 and a left eye image solid state light source 34 injects light into a second light input surface 31. The right eye image solid state light source 32 and the left eye image solid state light source 34 are capable of being modulated between the right eye image solid state light source 32 and the left eye image solid state light source 34 at a rate of at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While FIG. 1 is directed to any stereoscopic 3D backlight including those requiring shutterglasses or more than a single lightguide and associated liquid crystal display panel, the present disclosure is particularly useful for autostereoscopic displays. In other embodiments, the display is an OLED display, a plasma display, and the like.

A synchronization driving element 50 is electrically connected to the backlight 30 light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any transmissive liquid crystal display panel that has a frame response time of less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of at least 90 Hertz, or 100 Hertz, or 110 Hertz, or 120 Hertz, or greater than 120 Hertz. The illustrated backlight 30 includes a first light input surface 31 adjacent to the right eye image solid state light source 32 and an opposing second light input surface 33 adjacent to the left eye image solid state light source 34 and a light output surface 35. The solid state light sources can be any useful solid state light source that can be modulated at a rate of at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as white, red, blue, and/or green. The backlight can be a single layer of optically clear material with light sources at both ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure. These double sided prism films have an open angle of about 60 degrees and provide image separation of approximately equal to the distance between a viewer's eyes (i.e., about six degrees).

The image source 60 can be any useful image source capable of providing images frames (e.g., first image view and left image views) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
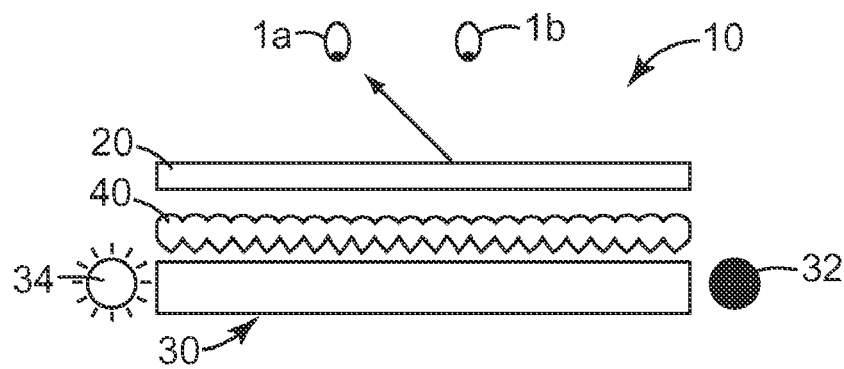
FIG. 2A and FIG. 2B are schematic side views of the illustrative display apparatus of FIG. 1 in operation.
Figure 2B:
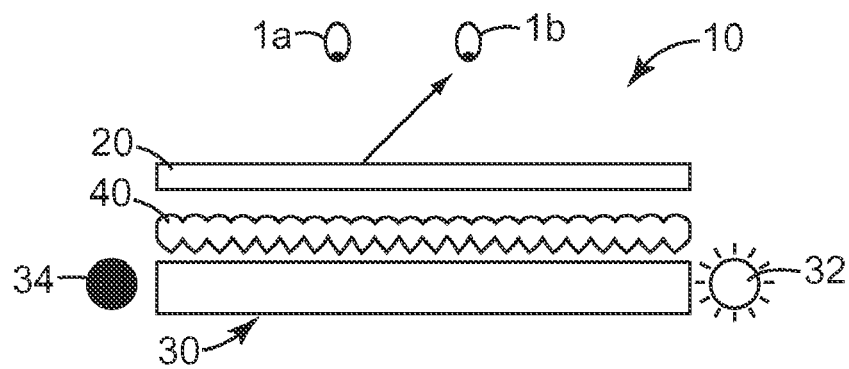

FIG. 2A and FIG. 2B are schematic side views of an illustrative stereoscopic display apparatus 10 in operation. In FIG. 2A the left eye image solid state light source 34 is illuminated and the right eye image solid state light source 32 is not illuminated. In this state, the light emitted from the left eye image solid state light source 34 transmits through the backlight 30, through the double sided prism sheet 40, and liquid crystal panel 20 providing a first image view (i.e., left eye image) directed toward the left eye 1a of an viewer or observer.

In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a second image view (i.e., right eye image) directed toward the right eye 1b of an viewer or observer.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized, otherwise cross-talk and a poor stereoscopic image will be perceived.

Figure 3:
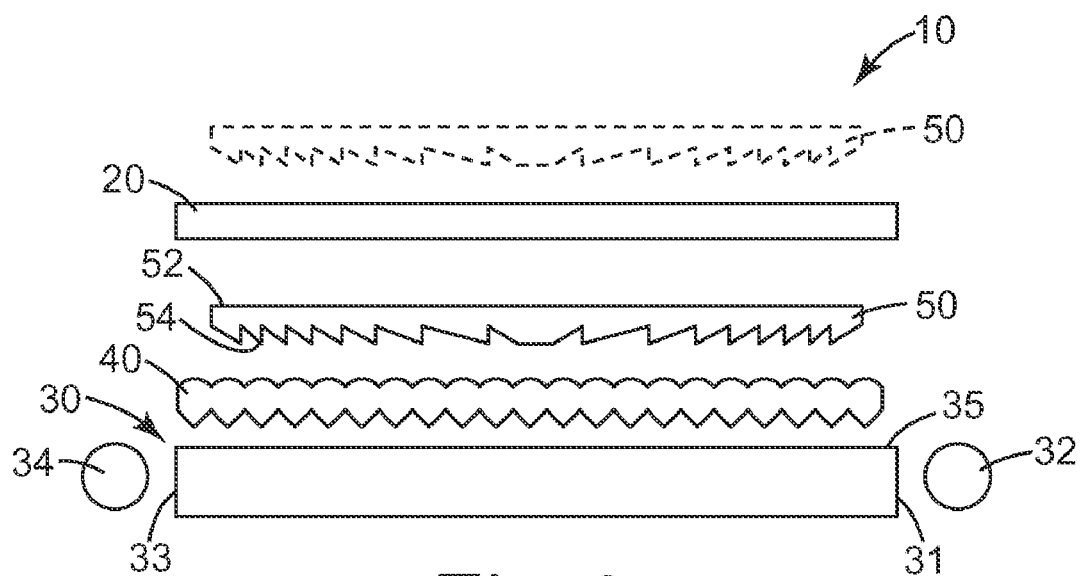
FIG. 3 is a schematic side view of the illustrative display apparatus of FIG. 1 including a Fresnel lens element.

FIG. 3 is a schematic side view of the illustrative display apparatus 10 of FIG. 1 including a Fresnel lens element 50. The display apparatus includes a liquid crystal display panel 20, and a backlight 30 positioned to provide light to the liquid crystal display panel 20, as described above. The backlight 30 includes a light transmission surface 35 and opposing light input surfaces 31, 33 and a right eye image solid state light source 32 injects light into a first light input surface 31 and a left eye image solid state light source 34 injects light into a second light input surface 31. The right eye image solid state light source 32 and the left eye image solid state light source 34 are capable of being modulated between the right eye image solid state light source 32 and the left eye image solid state light source 34 at a rate of at least 90 Hertz. A double sided prism film 40 is disposed between the liquid crystal display panel 20 and the backlight 30, as described above.

The Fresnel lens element 50 is disposed proximate to the double sided prism film 40. The double sided prism film 40 is disposed between the light transmission surface 35 of the backlight 30 and Fresnel lens element 50. In many embodiments, the Fresnel lens element 50 is disposed between the liquid crystal display panel 20 and the double sided prism film 40, as illustrated in FIG. 3. In other embodiments, the Fresnel lens element 50 is disposed to accept light transmitted by the liquid crystal display panel 20. In these embodiments, the liquid crystal display panel 20 is disposed between the double sided prism film 40 and the Fresnel lens element 50, as illustrated in phantom in FIG. 3. The Fresnel lens element 50 converges light transmitted from the double sided prism film 40 toward the viewer of the display 10.

The Fresnel lens element 50 includes a plano side 52 and a facet side (i.e., grooved side) 54. In many embodiments, the facet side 54 of the Fresnel lens element 50 is directed toward the double sided prism film 40 and the plano side 52 is directed toward the liquid crystal display panel 20 or viewer of the display 10. The Fresnel lens element 50 is described as a converging Fresnel lens element 50 as the Fresnel lens element 50 converges light toward the viewer of the display 10.

In many embodiments the Fresnel lens element 50 is a linear Fresnel lens element 50 that includes a plurality of parallel linear facets that extend linearly along a width of the display 10. In many embodiments, the Fresnel lens element 50 is a linear converging Fresnel lens element 50. In many embodiments the Fresnel lens element 50 is a linear Fresnel lens element 50 that includes a plurality of parallel linear facets that extend linearly along a width of the display 10 and are parallel to the linear lenticular features and linear prismatic features of the double sided prism film 40. In some embodiments the Fresnel lens element 50 is a linear Fresnel lens element 50 that includes a plurality of parallel linear facets that extend linearly along a width of the display 10 and are parallel to the linear lenticular features of the double sided prism film 40 and are in registration with a plurality of linear lenticular features of the double sided prism film 40.

In many embodiments, the Fresnel lens element 50 has a varying focal length as a function of location along the Fresnel lens element 50. Thus, in some embodiments a location along an edge of the Fresnel lens element 50 can have a shorter focal length than a location closer to a center of the Fresnel lens element 50.

Figure 4:
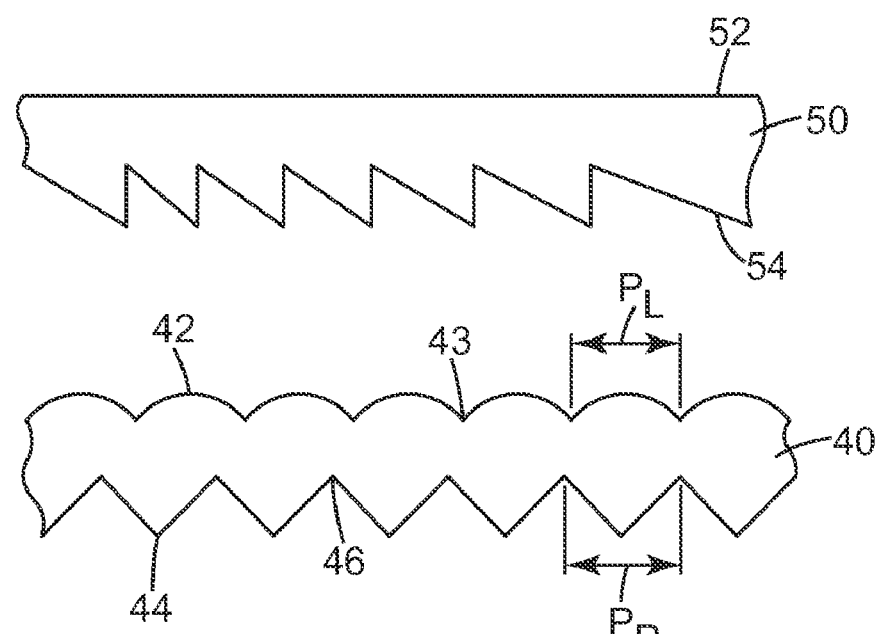
FIG. 4 is a cross-sectional view of a portion of the double sided prism film and Fresnel lens.

FIG. 4 is a cross-sectional view of a portion of the double sided prism film 40 and Fresnel lens element 50. The Fresnel lens element 50 includes a plano side 52 and a grooved facet side 54, as described above. The double sided prism film 40 includes plurality of parallel linear prism features 44 on a first major surface and a plurality of parallel linear lenticular features 42 on a second major surface opposing the second major surface.

The plurality of parallel linear prism features 44 have a pitch $P_P$ value and the plurality of parallel linear lenticular features 42 have a pitch $P_L$ value. The pitch $P_L$ value is defined as the linear distance between lenticular valleys 43. The pitch $P_P$ value is defined as the linear distance between prism valleys 46. In many embodiments the pitch $P_P$ value is greater than the pitch $P_L$ value. In many embodiments this difference in pitch is very small such as, for example, in a range from 0.001 to 0.2%, or from 0.01 to 0.1%. This difference in pitch for a double sided prism film 40 is termed herein a "differential pitch" double sided prism film 40. In many embodiments, lenticular features 42 are nominally aligned with prism features 44 at a center region of the double sided prism film 40 and the opposing features 42, 44 become more misaligned as the distance from the center of the film increases. This differential pitch double sided prism film 40 allows the film to gradually increase the "toe-in" of light as a function of the distance from the center of the double sided prism film 40. In many of these embodiments the maximum light "toe-in" is 10 degrees at the edge of the differential double sided prism film 40.

Figure 5:
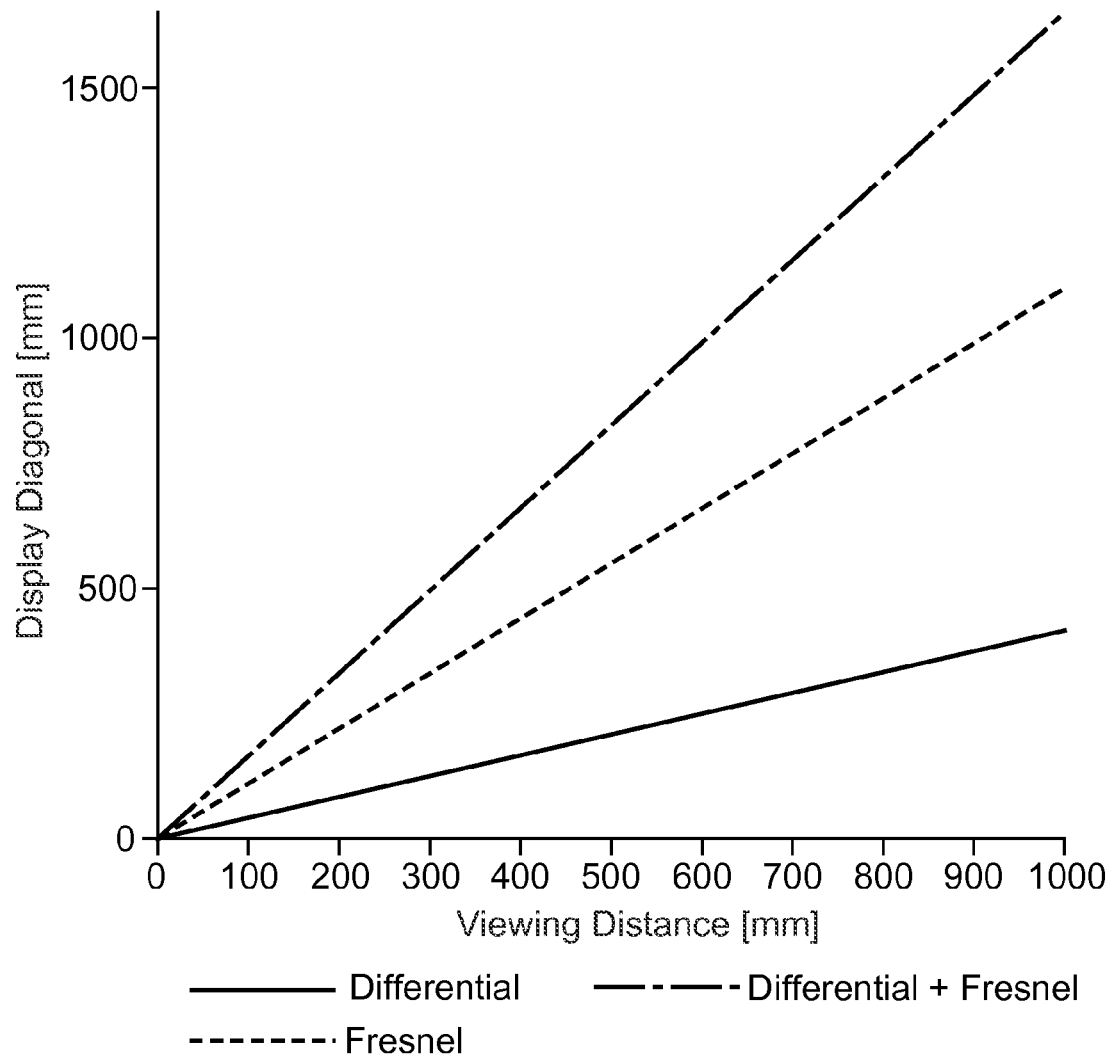
FIG. 5 is a nomogram illustrating the effect of the Fresnel lens element on autostereoscopic display viewing distance.

FIG. 5 is a nomogram illustrating the effect of the Fresnel lens element on autostereoscopic viewing distance. The nomogram illustrates that adding a Fresnel lens element to the autostereoscopic display device described herein allows 3D viewing of larger displays than is possible without the Fresnel lens element. The aspect ratio of the display was set to 16:10.

The solid line is labeled "differential" and refers to an autostereoscopic display as illustrated in FIG. 1 with the differential pitch double sided prism film described in FIG. 4. The maximum light toe-in angle for this differential pitch double sided prism film was 10 degree. As illustrated, a viewing distance of 1000 mm allows for a display diagonal of about 450 mm.

The doted line is labeled "Fresnel" and refers to an autostereoscopic display as illustrated in FIG. 1 without the differential pitch double sided prism film described in FIG. 4. The maximum light angle of the Fresnel lens element was 25 degrees. The facet side groove pitch was set to 0.088 mm, the plano side conjugate was set to $1 \times 10^9$ mm, the facet side conjugate was set to 500 mm, the half width was set to 200 mm, and the draft angle was set to 4 degrees. As illustrated, a viewing distance of 1000 mm allows for a display diagonal of about 1000 mm.

The alternating doted line is labeled "Differential+Fresnel" and refers to an autostereoscopic display as illustrated in FIG. 1 with the differential pitch double sided prism film described in FIG. 4. The maximum light toe-in angle for this differential pitch double sided prism film was 10 degree. The maximum light angle of the Fresnel lens element was 25 degrees. The facet side groove pitch was set to 0.088 mm, the plano side conjugate was set to $1 \times 10^9$ mm, the facet side conjugate was set to 500 mm, the half width was set to 200 mm, and the draft angle was set to 4 degrees. As illustrated, a viewing distance of 1000 mm allows for a display diagonal of about 1600 mm.

The nomogram illustrates that adding a Fresnel lens element and the differential pitch double sided prism film to the autostereoscopic display device described herein allows 3D viewing of larger displays than is possible with or without the Fresnel lens element or differential pitch double sided prism film.

Thus, embodiments of the AUTOSTEREOSCOPIC DISPLAY WITH FRESNEL LENS ELEMENT are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:
1. An autostereoscopic display apparatus comprising:
a backlight having opposing first and second light input surfaces and a light transmission surface extending between the opposing first and second light input surfaces and a right eye light source located to provide light into the first light input side and a left eye light source located to provide light into the second light input side, wherein the left eye light source and the right eye light source are configured to be modulated between the left eye light source and the right eye light source at a rate of at least 90 hertz;
a double sided prism film adjacent to the light transmission surface, the double sided prism film having a plurality of linear prism features on a first major surface and a plu- rality of lenticular features on a second major surface, the first major surface opposing the second major surface;

a Fresnel lens element, wherein the double sided prism film is disposed between the light transmission surface and the Fresnel lens element; and a liquid crystal display panel positioned to receive light transmitted through the double sided prism film.

2. An autostereoscopic display apparatus according to claim 1, wherein the Fresnel lens element is a linear converging Fresnel lens.

3. An autostereoscopic display apparatus according to claim 1, wherein the Fresnel lens element has a facet side facing the double sided prism film.

4. An autostereoscopic display apparatus according to claim 1, wherein the Fresnel lens element is a linear Fresnel lens having linear facets that extend parallel to the lenticular features.

5. An autostereoscopic display apparatus according to claim 1, wherein the Fresnel lens element has a varying focal length as a function of position along the Fresnel.

6. An autostereoscopic display apparatus according to claim 1, wherein the plurality of linear prism features have a period value being larger than the plurality of lenticular features period value.

7. An autostereoscopic display apparatus according to claim 1, wherein at least selected linear prism features are not in registration with opposing lenticular features.

8. An autostereoscopic display apparatus according to claim 1, wherein the Fresnel lens element is disposed between the liquid crystal display panel and the double sided prism film.

9. An autostereoscopic display apparatus according to claim 1, wherein the liquid crystal display panel is disposed between the Fresnel lens element and the double sided prism film.

10. An autostereoscopic display apparatus comprising:

a backlight having opposing first and second light input surfaces and a light transmission surface extending between the opposing first and second light input surfaces and a right eye light source located to provide light into the first light input side and a left eye light source located to provide light into the second light input side, wherein the left eye light source and the right eye light source are configured to be modulated between the left eye light source and the right eye light source at a rate of at least 90 hertz;

a double sided prism film adjacent to the light transmission surface, the double sided prism film having a plurality of linear prism features on a first major surface and a plurality of lenticular features on a second major surface, the first major surface opposing the second major surface;

a Fresnel lens element, wherein the double sided prism film is disposed between the light transmission surface and the Fresnel lens element;

a liquid crystal display panel positioned to receive light transmitted through the double sided prism film; and a synchronization driving element that synchronizes activation and deactivation of the right eye image solid state light source and the left eye image solid state light source with image frames displayed on the liquid crystal display panel.

11. An autostereoscopic display apparatus according to claim 10, wherein the Fresnel lens element is a linear converging Fresnel lens.

12. An autostereoscopic display apparatus according to claim 11, wherein the Fresnel lens element has a facet side facing the double sided prism film.

13. An autostereoscopic display apparatus according to claim 12, wherein the Fresnel lens element includes linear facets that extend parallel to the lenticular features.

14. An autostereoscopic display apparatus according to claim 13, wherein at least selected linear facets are registered with opposing lenticular features.

15. An autostereoscopic display apparatus according to claim 10, wherein the plurality of linear prism features have a period value being larger than the plurality of lenticular features period value.

16. An autostereoscopic display apparatus according to claim 10, wherein at least selected linear prism features are not in registration with opposing lenticular features.

17. An autostereoscopic display apparatus according to claim 10, wherein the Fresnel lens element is disposed between the liquid crystal display panel and the double sided prism film.

18. An autostereoscopic display apparatus according to claim 10, wherein the Fresnel lens element has a varying focal length as a function of position along the Fresnel.

19. An autostereoscopic display apparatus comprising:

a backlight having opposing first and second light input surfaces and a light transmission surface extending between the opposing first and second light input surfaces and a right eye light source located to provide light into the first light input side and a left eye light source located to provide light into the second light input side, wherein the left eye light source and the right eye light source are configured to be modulated between the left eye light source and the right eye light source at a rate of at least 90 hertz;

a double sided prism film adjacent to the light transmission surface, the double sided prism film having a plurality of linear prism features on a first major surface and a plurality of lenticular features on a second major surface, the first major surface opposing the second major surface;

a liquid crystal display panel positioned to receive light transmitted through the double sided prism film;

a linear converging Fresnel lens element disposed between the double sided prism film and the liquid crystal display panel, the Fresnel lens element having a facet side facing the double sided prism film, and the facet side comprising a plurality of linear facets extending parallel to the lenticular features, the linear converging Fresnel lens converging light transmitted through the double sided prism film toward a viewer of the autostereoscopic display apparatus; and a synchronization driving element that synchronizes activation and deactivation of the right eye image solid state light source and the left eye image solid state light source with image frames displayed on the liquid crystal display panel.

20. An autostereoscopic display apparatus according to claim 19, wherein the plurality of linear prism features have a period value being larger than the plurality of lenticular features period value.

* * * * *